United States Patent
Thompson

(10) Patent No.: US 8,261,521 B2
(45) Date of Patent: *Sep. 11, 2012

(54) SELF-LEVELING FOUR-BAR LINKAGE FOR SUSPENDING A HEADER OF AN AGRICULTURAL IMPLEMENT

(75) Inventor: Kent L. Thompson, Otley, IA (US)

(73) Assignee: Vermeer Manufacturing Company, Pella, IA (US)

( * ) Notice: Subject to any disclaimer, the term of this patent is extended or adjusted under 35 U.S.C. 154(b) by 269 days.

This patent is subject to a terminal disclaimer.

(21) Appl. No.: 12/550,797

(22) Filed: Aug. 31, 2009

(65) Prior Publication Data

US 2011/0047948 A1    Mar. 3, 2011

(51) Int. Cl.
*A01D 34/00* (2006.01)
(52) U.S. Cl. ........................................ 56/15.8
(58) Field of Classification Search ............... 56/10.2 E, 56/14.9, 15.1–15.9, DIG. 10, DIG. 14, DIG. 22
See application file for complete search history.

(56) References Cited

U.S. PATENT DOCUMENTS

| | | | | |
|---|---|---|---|---|
| 3,517,491 | A * | 6/1970 | Harer et al. | ........................ 56/11.9 |
| 3,592,106 | A | 7/1971 | Baughman | |
| 4,177,627 | A | 12/1979 | Cicci | |
| 4,207,802 | A | 6/1980 | Homuth | |
| 4,286,423 | A * | 9/1981 | Caldwell et al. | ........................ 56/6 |
| 4,343,138 | A * | 8/1982 | Neuerburg | ........................ 56/15.9 |
| 4,506,609 | A * | 3/1985 | Fuss et al. | ........................ 111/136 |
| 4,599,852 | A | 7/1986 | Kerber | |
| 4,676,053 | A | 6/1987 | Pruitt | |
| 4,719,742 | A | 1/1988 | Ermacora | |
| 4,723,396 | A * | 2/1988 | Ermacora | ........................ 56/13.6 |
| 4,723,401 | A | 2/1988 | Webster | |
| 4,724,661 | A | 2/1988 | Blakeslee | |
| 4,970,848 | A | 11/1990 | Neuerburg | |
| 5,060,462 | A | 10/1991 | Helfer | |

(Continued)

FOREIGN PATENT DOCUMENTS

EP    456900    11/1991

(Continued)

OTHER PUBLICATIONS 1 sheet showing a New Holland—Section 8 Hydraulic Cylinder.

*Primary Examiner* — Thomas B Will
*Assistant Examiner* — Mai Nguyen
(74) *Attorney, Agent, or Firm* — Sturm & Fix LLP

(57) ABSTRACT

A suspension system for agricultural implements having at least one floating head using a four-bar linkage, and permitting the floating head to accommodate variations in ground surface elevation in a lateral or transverse direction. By permitting the floating head to float, a more consistent cutting height is realized when ground surface elevation varies in a transverse direction. A main frame is provided to which the ground engaging wheels are attached. A sub-frame is connected to the main frame via the four-bar linkage. The sub-frame is pivotally attached to the arms of the four-bar linkage by spherical and cylindrical bearings. The lower linkage arms of the four-bar linkage are maintained in compression while the upper linkage arms are maintained in tension. Due to the compression and tension in the linkage arms, the floating head will self-level in the transverse direction when raised, yet allow the header to float during operation.

34 Claims, 15 Drawing Sheets

U.S. PATENT DOCUMENTS

| | | | |
|---|---|---|---|
| 5,107,663 A | 4/1992 | Wattron | |
| 5,193,330 A * | 3/1993 | Nusser | 56/6 |
| 5,203,154 A | 4/1993 | Lesher | |
| 5,337,544 A | 8/1994 | Lauritsen | |
| 5,417,042 A | 5/1995 | Walch | |
| 5,566,535 A | 10/1996 | Pruitt | |
| 5,566,536 A | 10/1996 | Krafka | |
| 5,737,859 A * | 4/1998 | Tardif | 37/389 |
| 5,992,133 A | 11/1999 | Walch | |
| 6,035,478 A * | 3/2000 | Miller et al. | 15/82 |
| 6,055,800 A | 5/2000 | Walch | |
| 6,076,341 A * | 6/2000 | Gummerson | 56/17.2 |
| 6,085,501 A | 7/2000 | Walch | |
| 6,125,619 A | 10/2000 | Wolff | |
| 6,186,043 B1 | 2/2001 | Callies | |
| 6,238,170 B1 * | 5/2001 | Pingry et al. | 414/550 |
| 6,250,055 B1 | 6/2001 | Franet | |
| 6,269,619 B1 | 8/2001 | Walch | |
| 6,308,504 B1 | 10/2001 | Walch | |
| 6,345,490 B1 * | 2/2002 | Wolff | 56/15.2 |
| 6,360,516 B1 | 3/2002 | Harkcom | |
| 6,381,935 B1 | 5/2002 | Wattron | |
| 6,655,118 B1 | 12/2003 | Thompson | |
| 6,662,540 B1 | 12/2003 | Harkcom | |
| 6,666,010 B2 * | 12/2003 | Beaufort et al. | 56/228 |
| 6,698,113 B1 | 3/2004 | Jones | |
| 6,758,031 B2 | 7/2004 | Franet | |
| 6,782,680 B2 * | 8/2004 | Viaud et al. | 56/13.6 |
| 6,907,719 B2 | 6/2005 | Ligouy | |
| 7,024,844 B2 | 4/2006 | Schlesser | |
| 7,047,714 B1 | 5/2006 | Stephenson | |
| 7,596,935 B2 * | 10/2009 | Bollinger et al. | 56/14.9 |
| 7,658,056 B2 * | 2/2010 | Thompson et al. | 56/15.8 |
| 7,726,109 B2 * | 6/2010 | Thompson et al. | 56/15.8 |
| 7,958,707 B2 * | 6/2011 | Thompson et al. | 56/15.8 |
| 7,996,794 B2 * | 8/2011 | Kobayashi et al. | 716/51 |
| 2003/0221401 A1 * | 12/2003 | Ligouy | 56/14.7 |
| 2004/0035288 A1 | 2/2004 | Hawthorne | |
| 2006/0248870 A1 * | 11/2006 | Geiser | 56/344 |
| 2007/0144130 A1 | 6/2007 | Geiser | |
| 2009/0107097 A1 | 4/2009 | Thompson | |
| 2009/0107100 A1 * | 4/2009 | Bollinger et al. | 56/218 |

FOREIGN PATENT DOCUMENTS

| | | |
|---|---|---|
| EP | 0642731 | 3/1995 |

* cited by examiner

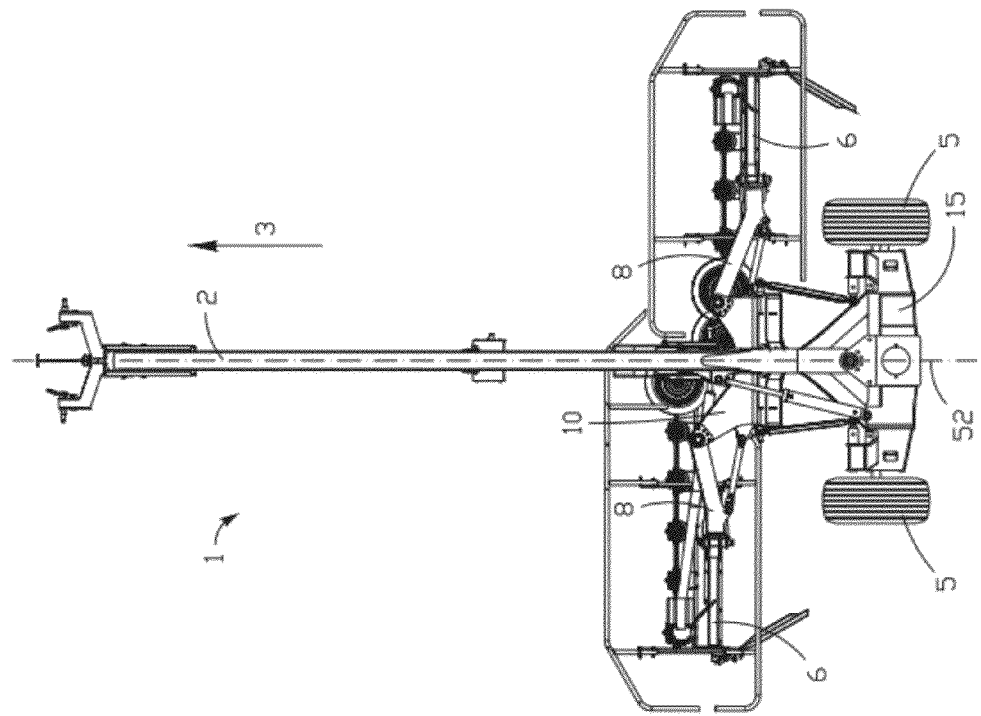
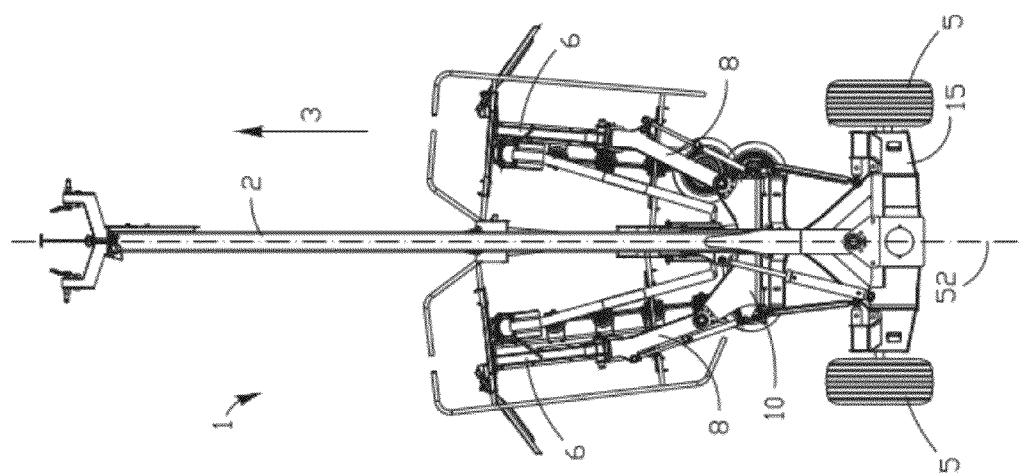
Fig. 5b
Fig. 5a

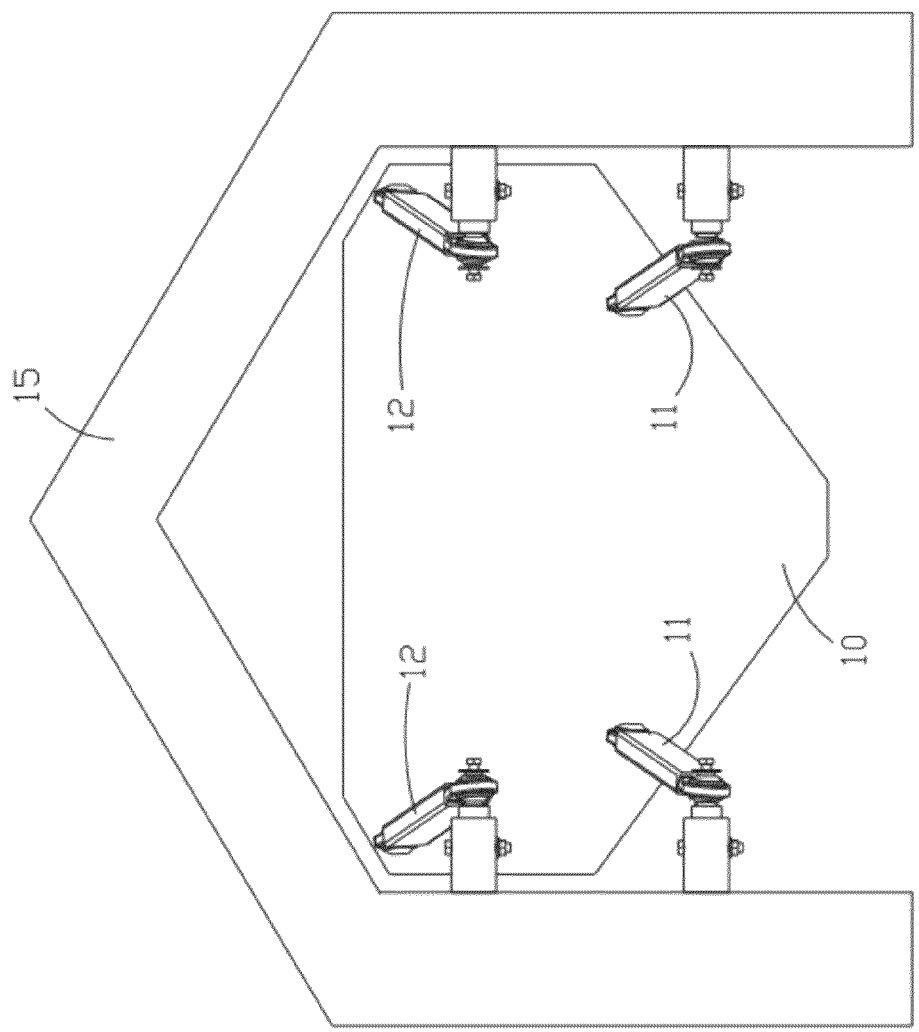

SELF-LEVELING FOUR-BAR LINKAGE FOR SUSPENDING A HEADER OF AN AGRICULTURAL IMPLEMENT

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

BACKGROUND OF THE INVENTION

1. Field of the Invention

The present invention relates generally to an agricultural implement, including a work tool. More particularly, the present invention relates to an improved suspension system for agricultural implements having one or more floating work tools.

2. Background Art

Ground on which forage crops or other mowable foliage is grown is rarely smooth. Such ground essentially always varies in level both in a direction of travel of the mowing machine or harvester, and in a transverse or lateral direction.

Mowing machines having a variable height cutter have been available for decades. Mounted sickle mowers used in the mid-twentieth century could be raised and lowered using the tractor lift system. Towed mowers, by necessity, were made so the work tool could be raised and lowered, at least between an operating position and a transport position.

U.S. patent application Ser. No. 11/927,866 to Thompson et al. filed Oct. 30, 2007 is incorporated herein by reference in its entirety, relates to the field of this invention and is prior art to the instant application at this time.

In U.S. Pat. No. 6,250,055, a mower header suspension system is disclosed and is incorporated herein by reference. The suspension system comprises a pair of lower linkage arms and a single upper suspension arm. Provision for changes in ground elevation in the direction of travel is disclosed.

Disclosed in U.S. Pat. No. 6,055,800 is a mower header suspension system providing a variable header angle compared to the longitudinal direction and is incorporated herein by reference. The disclosed mechanism comprises two lower linkage arms and a single upper linkage arm.

The above described header suspension systems provide for changing the height of cut relative to the ground surface supporting the ground engaging wheels of the tractor or towed mower, but do not provide for a consistent cut height on ground that varies in level both in the direction of travel and in the lateral direction.

There is, therefore, a need for a method and apparatus for providing flexibility in header position to permit the header to raise and lower as ground elevation changes, and to rotate to adjust to lateral variations in ground surface levels.

There is an additional need for a header suspension system providing self-leveling, in the transverse direction, when the header is positioned in its transport mode.

BRIEF SUMMARY OF THE INVENTION

An object of the present invention is to provide a work tool suspension system that enables a header or work tool of a towed implement to be raised and lowered so mowing height can be varied. Another object is to provide a work tool suspension system permitting the header or work tool to follow the variable ground contour—both in the direction of travel and transverse to the direction of travel, resulting in a consistent cut height despite the variability of the ground elevation. Still another object is to provide a work tool suspension system providing for self-leveling in the transverse direction when the header or work tool is raised to its transport height.

For the purposes of this document, including the claims, a towed implement is an implement with ground engaging wheels or the like, independent of the source of motive power, for example a farm tractor; additionally, the towed implement has a frame or other component that may be raised and lowered relative to the ground engaging wheels independent of a lift, such as a standard three-point or two-point lift system, of the source of motive power. Therefore, a towed vehicle is pulled by the source of motive power. The towed vehicle may make use of the source of motive power's hydraulic system for raising and lowering, but does not make use of lift arms usually attached to a farm tractor.

The mower comprises two integrated frames connected by two sets of linkages to create a four-bar linkage. As with any four-bar linkage, the two sets of linkages are maintained parallel to one another, so that the two frames are maintained at a known orientation to one another as the header is raised and lowered.

The lower linkage set preferably comprises two links oriented at angles with respect to a longitudinal axis of the mower such that they connect to the sub-frame at points nearer the longitudinal axis than those points at which they connect to the main frame.

In contrast, the upper links are angled such that they connect to the sub-frame at points farther from the longitudinal axis than those points at which the upper links connect to the main frame.

A spherical bearing provides a joint between two links, the joint having a pivot point. In other words, there is no unique axis of rotation. In contrast, a cylindrical bearing disposed between two links provides an axis on which the links pivot relative to one another. Rotation about any other axis requires straining of the cylindrical bearing or the links.

Spherical bearings are used to connect each independent bar of the upper linkage set to the main frame and to the sub-frame. As well, spherical bearings are also used to connect the lower linkage bars to the sub-frame. The lower linkage bars are pivotally attached to the main frame by cylindrical bearings.

In a first embodiment, the lower linkage bars are affixed to one another where the lower linkage bars converge at their sub-frame ends, and are subsequently connected to the sub-frame using a single spherical bearing. In an alternative embodiment, the two lower linkage bars are not directly connected to one another, but are pivotally connected to the sub-frame by independent spherical bearings in the same manner as the upper linkage bars.

The linkage arrangement herein described allows the sub-frame the ability to rotate about an axis of rotation parallel to the longitudinal axis of the mower. This ability is called "float" and refers to the capability of the mower to adjust itself automatically to a ground slope perpendicular to the direction of travel.

An additional feature of the above-described arrangement of links is self-leveling. Due to constant tension in the upper links and constant compression in the lower links, the work tool or header will level itself when drawn up to its uppermost, or transport position.

Other objects, advantages and novel features of the present invention will become apparent from the following detailed description of the invention when considered in conjunction with the accompanying drawings.

BRIEF DESCRIPTION OF THE DRAWINGS

FIG. 5a is a top plan view of the sub-frame in a transport configuration showing arms of the working tool rotated inward toward the longitudinal axis, narrowing the implement, for transport;

FIG. 5b is a top plan view of the sub-frame in an operating configuration showing the working tool arms rotated outward from the longitudinal axis in an operating configuration;

FIG. 8a is a rear elevation view of the mower in a second embodiment having individual links at a bottom of the four-bar linkage system;

DETAILED DESCRIPTION OF THE INVENTION

Figure 1A:
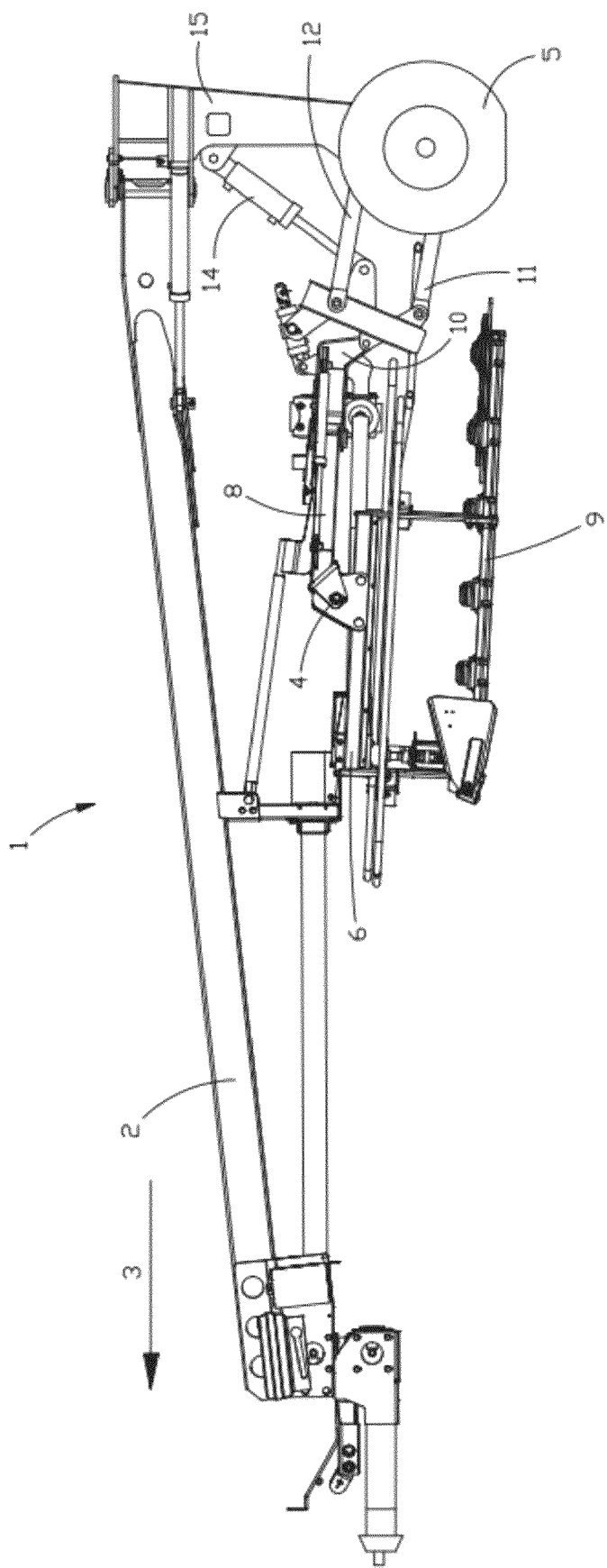
FIG. 1a is a side elevation of an agricultural mower.
Figure 1B:
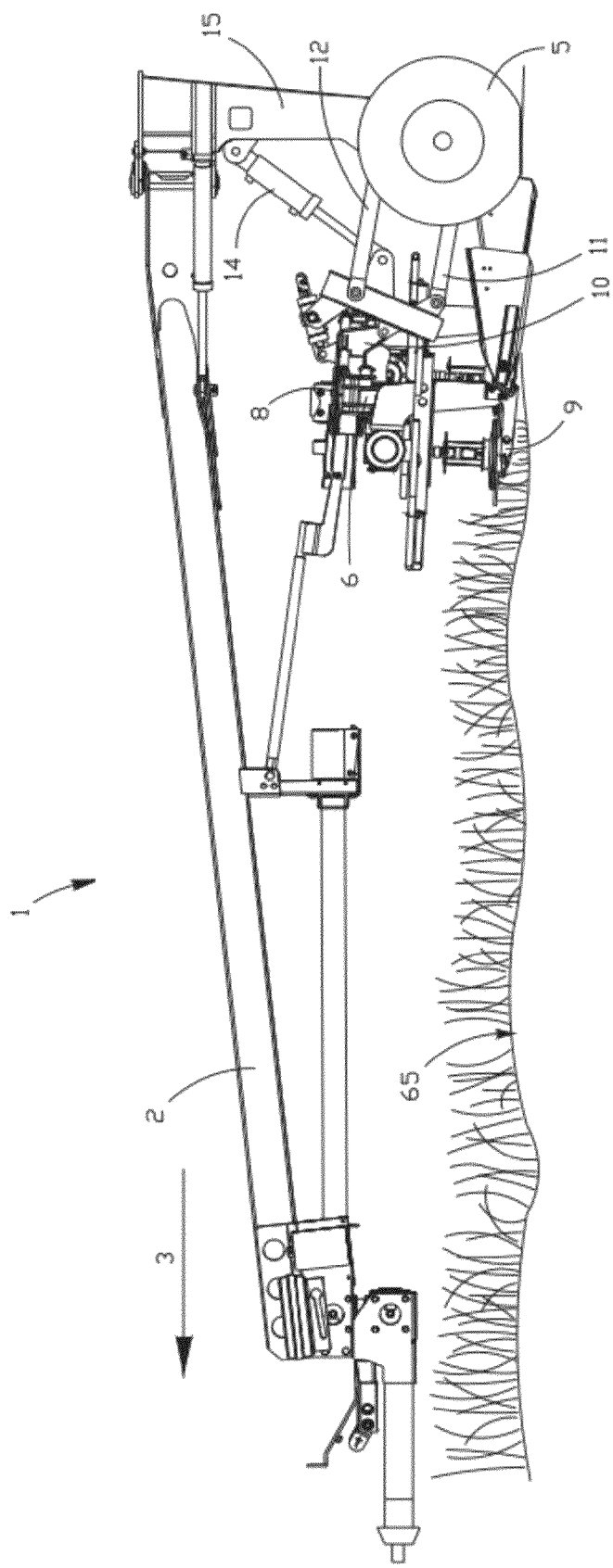
FIG. 1b is a side elevation of the agricultural mower in an operating configuration.

Referring now to the drawings wherein like reference numerals indicate identical or corresponding parts throughout the several views, the present invention in its preferred embodiment comprises a suspension system for an agricultural mower 1, shown in its entirety in FIGS. 1a, 1b, 6a, 6b, and 9-12. The mower 1 comprises a sub-frame 10 and a main frame 15 on which wheels 5 are operatively, rotatably attached. A tongue 2, extending over the machine, is pivotally connected to a top of the main frame 15, disposed at the extreme rear of the agricultural mower 1. As can best be seen in FIGS. 2, 7, and 8, the main frame 15 has left and right legs mounted atop axles between the two ground engaging wheels 5 for supporting the agricultural mower 1 on a ground surface 65. The axis of rotation of these wheels is substantially perpendicular to a forward direction of travel 3. A sub-frame 10 is operatively connected to the main frame 15, forward of the main frame 15, by means of a four-bar linkage system. The sub-frame 10 is a two part frame, suspending the work tool, header or cutter bar 9.

Figure 12:
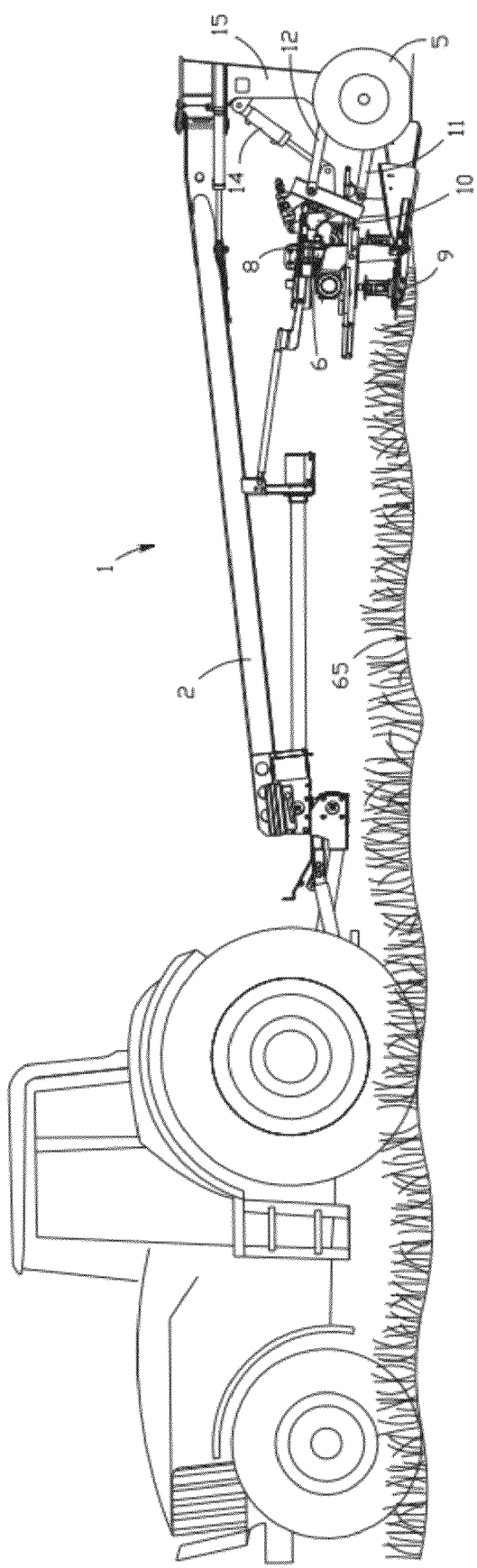
FIG. 12 is a side elevation view of the mower connected to an agricultural tractor.

The tongue 2 is preferably drawn by an agricultural tractor 100 as shown in FIG. 12. The mower 1 is normally drawn in the direction 3 toward the tongue 2, which direction is hereby defined as the forward direction. Based on this, the rearward direction is hereby defined, for the purposes of this document including the claims, as opposite the forward direction of travel 3.

A front of the mower 1 is likewise hereby defined as the general portion of the mower 1 in the lead as the mower 1 is drawn in the forward direction. A rear of the mower 1 is hereby defined as the general portion of the mower 1 seen when viewed from the end of the mower 1 opposite the tongue and facing in the forward direction.

A longitudinal direction is hereby defined as a direction parallel to the forward direction. A transverse direction is hereby defined as a direction perpendicular to the longitudinal direction, and parallel to an appropriate average of a slope of the ground surface in the vicinity of a header 6.

The verb, narrow, is defined herein as a reduction in a width of the implement in the transverse direction. The implement is narrowed for transport. Narrow does not imply shorten, which is a reduction in length in the longitudinal direction.

The above definitions are defined for the purposes of this document, including the claims.

Figure 7:
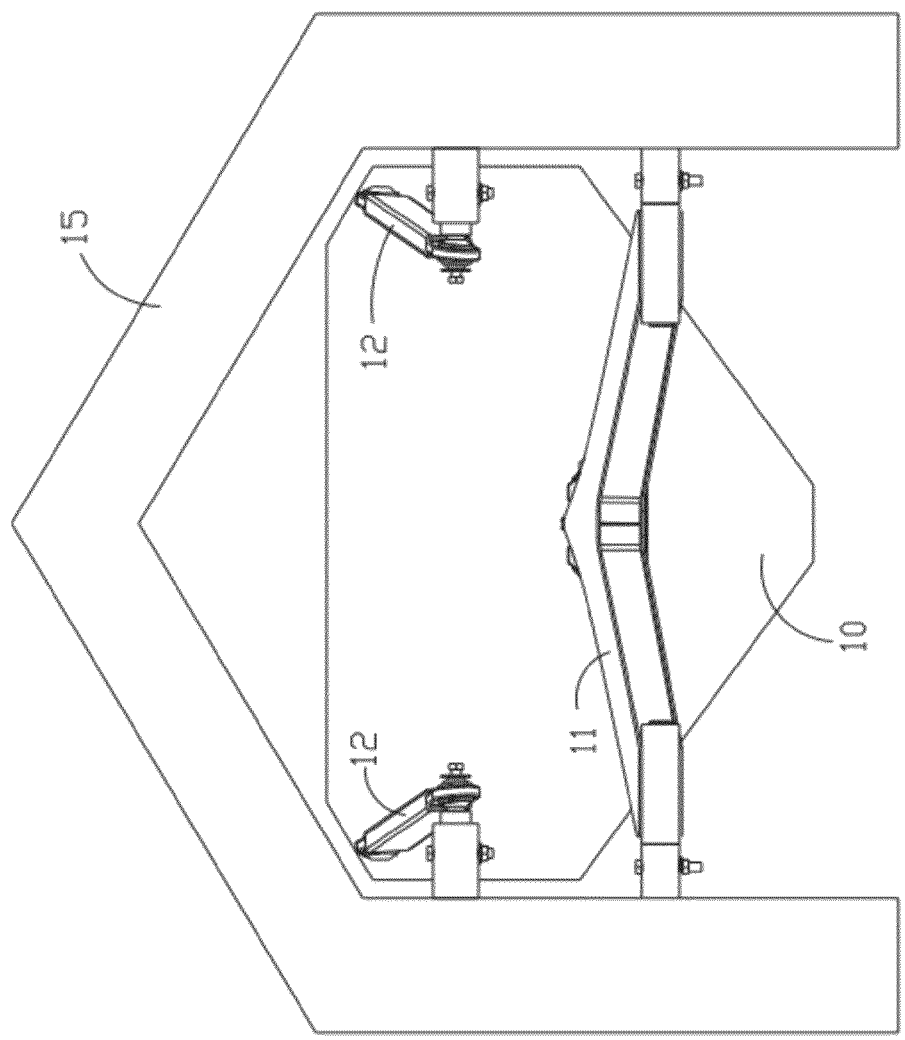
FIG. 7 is a rear elevation view of the mower in the first embodiment of the present invention.
Figure 8B:
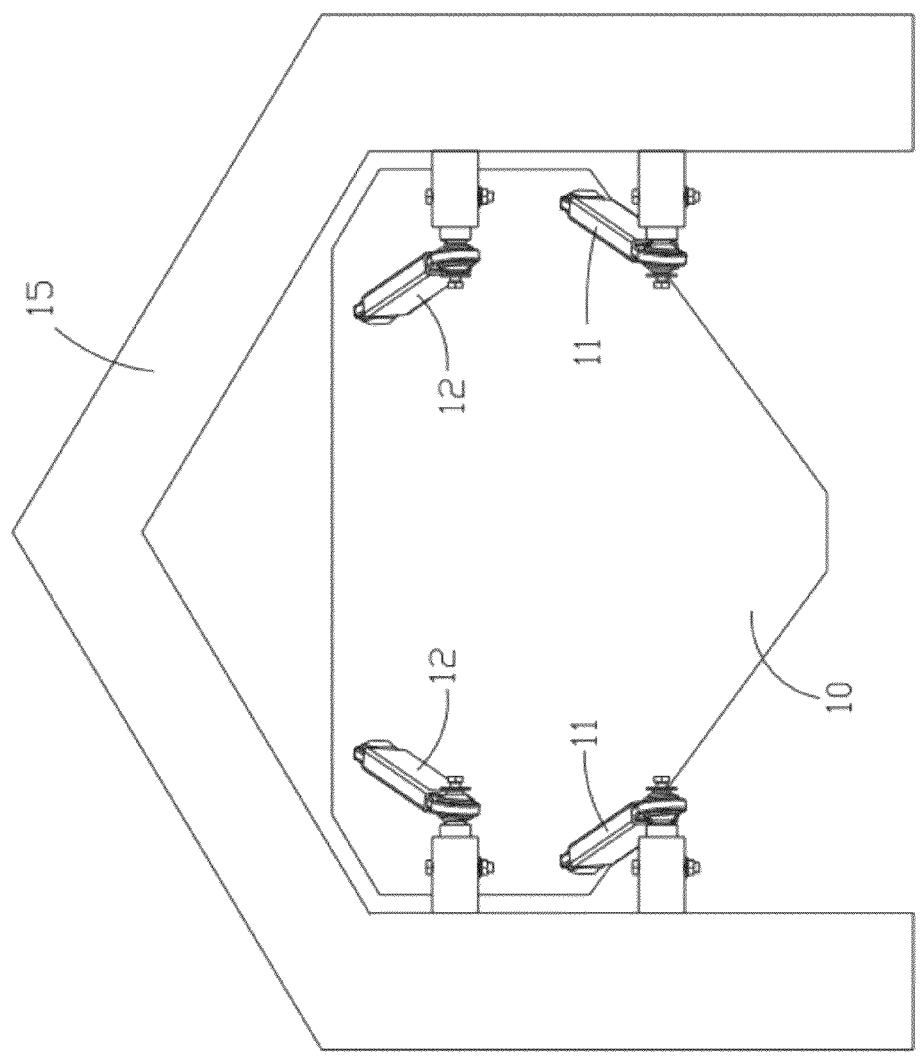
FIG. 8b is a rear elevation view of the mower in a third embodiment having individual links at a bottom of the four-bar linkage system.

The present invention comprises a four-bar linkage system including an upper set of linkages 12 and a lower set of linkages 11, each comprising two bars as illustrated in FIGS. 2-4, 7-8b, and 13. The upper linkage set 12 and the lower linkage set 11 are substantially parallel to one another when considering a side elevation view such as those featured in FIGS. 1a, 1b, 3, 4, 9, and 13. As shown in the plan views of FIGS. 5a and 5b, and the rear elevation view, FIG. 7, the bars belonging to the lower linkage set 11 are oriented in such a way as to be angled with respect to a longitudinal axis 52 of the mower 1. The lower links 11 may be angled such that they connect to the sub-frame 10 at points nearer the longitudinal axis 52 than those points at which the lower links 11 connect to the main frame 15 as shown in FIGS. 7 and 8a, or the connections at the sub-frame 10 may be farther from the longitudinal axis 52 than the connecting points at the main frame 15, as shown in FIG. 8b. The upper links 12 may also be angled in either of these arrangements as can be seen by comparing FIGS. 7 and 8a to FIG. 8b.

Figure 10:
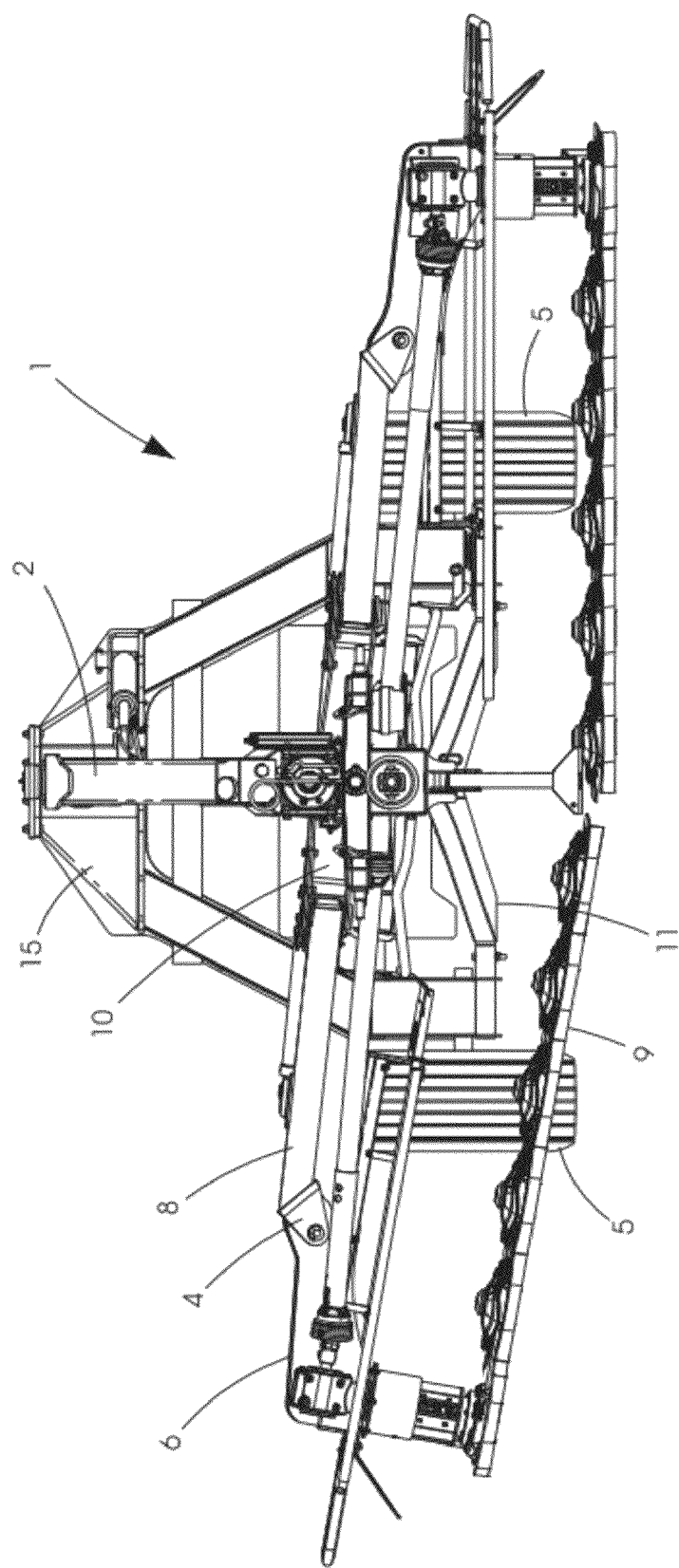
FIG. 10 is a front elevation view of the mower in operational mode with the work tool tilted in float.

Each independent bar of the upper linkage set 12 is pivotally connected to the main frame 15 by a spherical bearing, also known as a ball joint, at a first point and is pivotally connected to the sub-frame 10 by a spherical bearing at a second point. The use of ball joints on the upper linkage set 12 permits the sub-frame 10 to sway transversely at its top, hence providing float for the header 9 as can be seen in FIG. 10.

As illustrated in FIGS. 7-8b, each bar of the lower linkage 11 is pivotally connected to the main frame 15 by a cylindrical bearing at a first point and pivotally connected to the sub-frame 10 by a spherical bearing at a second point. In a first embodiment, the two lower linkage bars 11 are rigidly affixed to one another where the lower linkage bars 11 converge at the sub-frame 10, and are connected to the sub-frame 10 with a single spherical bearing, as shown in FIG. 7. In a second embodiment, illustrated in FIGS. 8a and 8b, the two lower linkage bars 11 are not directly connected to one another, but are pivotally connected to the sub-frame 10 by independent spherical bearings in the same manner as the upper linkage bars 12.

The use of cylindrical bearings between the lower linkage members 12 and the main frame 15 restricts the lower linkage arms 11 to a pivot on a single axis of rotation. The spherical bearing or bearings at the connecting point between the sub-frame 10 and the lower linkage arms 11 permit the sub-frame to rotate about an axis parallel to the longitudinal axis 52, as well as an axis perpendicular to the longitudinal axis 52. Hence, the header 9 may be raised and lowered between the transport and operational positions, as well as float while in the operational mode.

The linkage arrangements described above allow the sub-frame 10 to rotate about an axis of rotation parallel to the longitudinal axis 52 (see FIGS. 5a and 5b). This ability is hereby defined as float for the purposed of this document, including the claims, and implies the capability of the combined header sections 9 of the mower 1 to adjust automatically to a ground slope as projected on a plane perpendicular to the direction of travel. Float is effected by virtue of the rotation of the sub-frame 10. In FIG. 10, the mower 1 is shown in the float mode in which the header is angled about the longitudinal axis 52.

Figure 2:
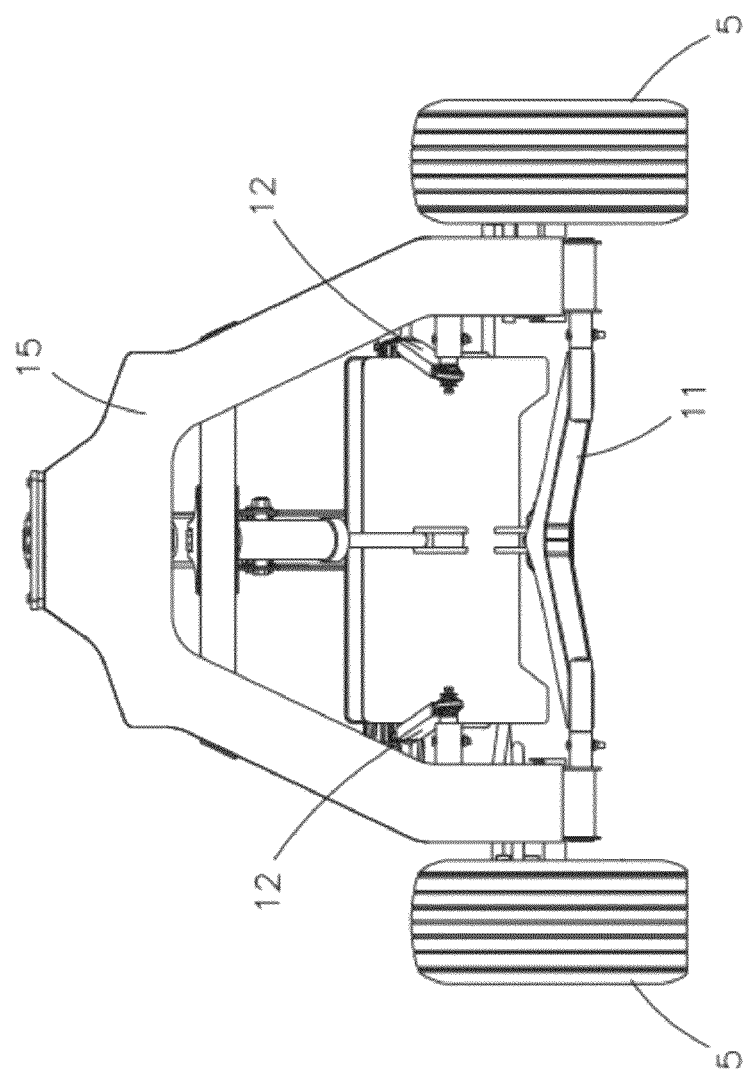
FIG. 2 is a rear elevation view of the mower showing a four-bar linkage system arrangement.
Figure 4:
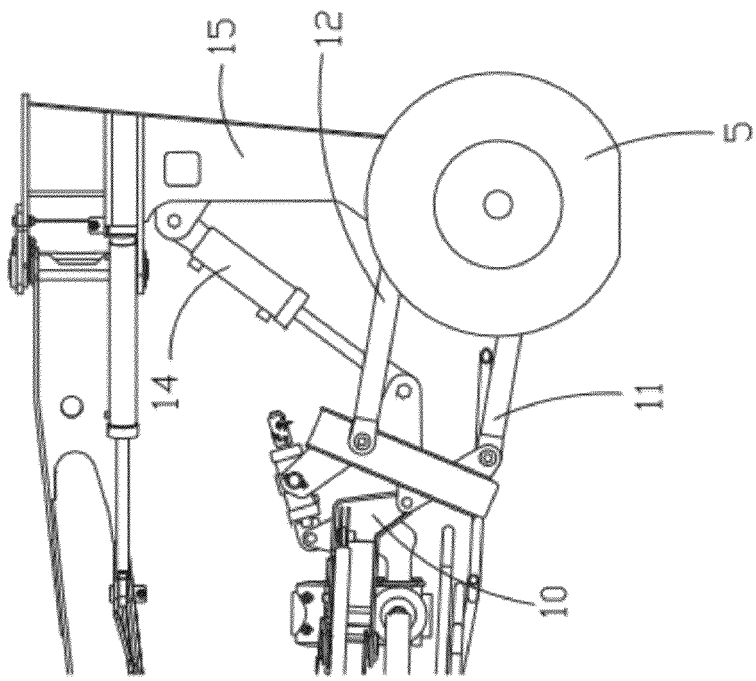
FIG. 4 is a left side elevation view of the rear of the mower showing the pivot point in the sub-frame about which the cutter bar pitch is controlled.
Figure 3:
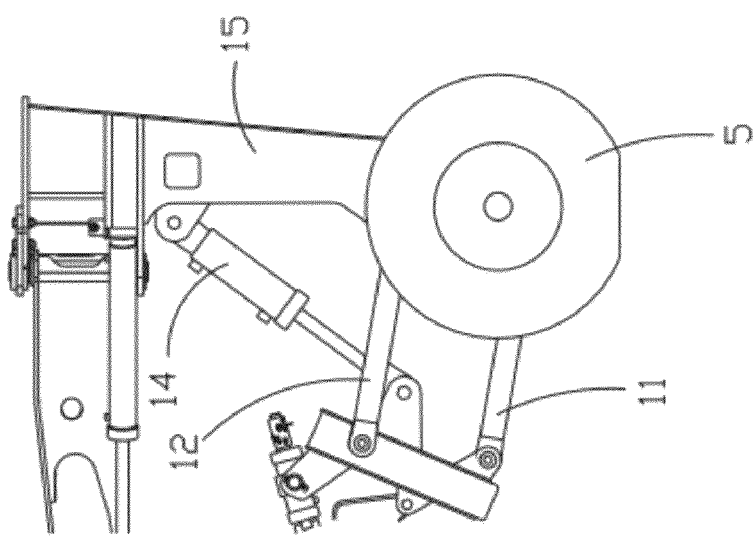
FIG. 3 is a left side elevation view of the rear of the mower showing the main frame mounted on wheels and indicating the parallelism of the two linkage levels.
Figure 6A:
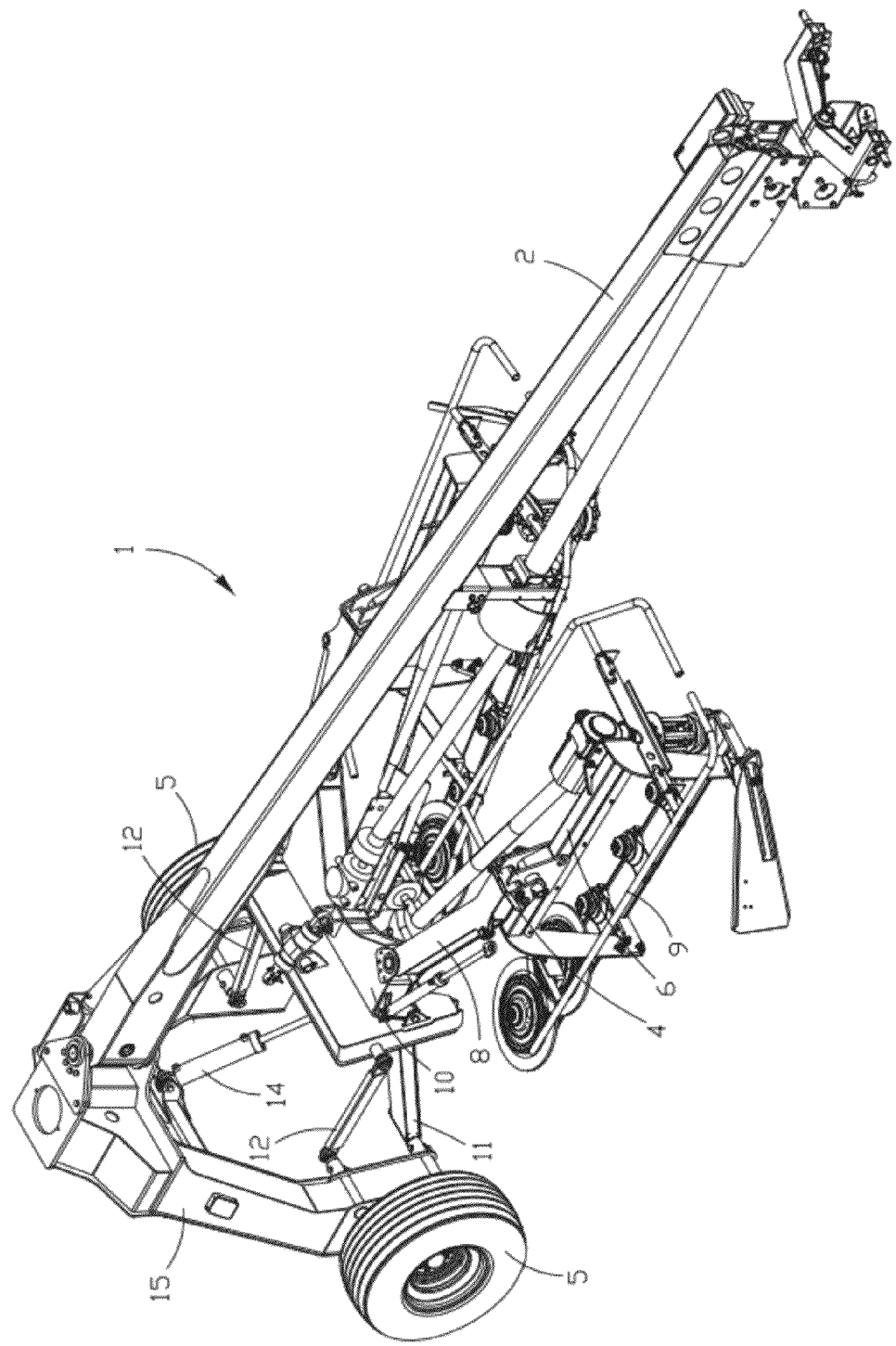
FIG. 6a is an isometric view of the mower in the transport configuration.
Figure 6B:
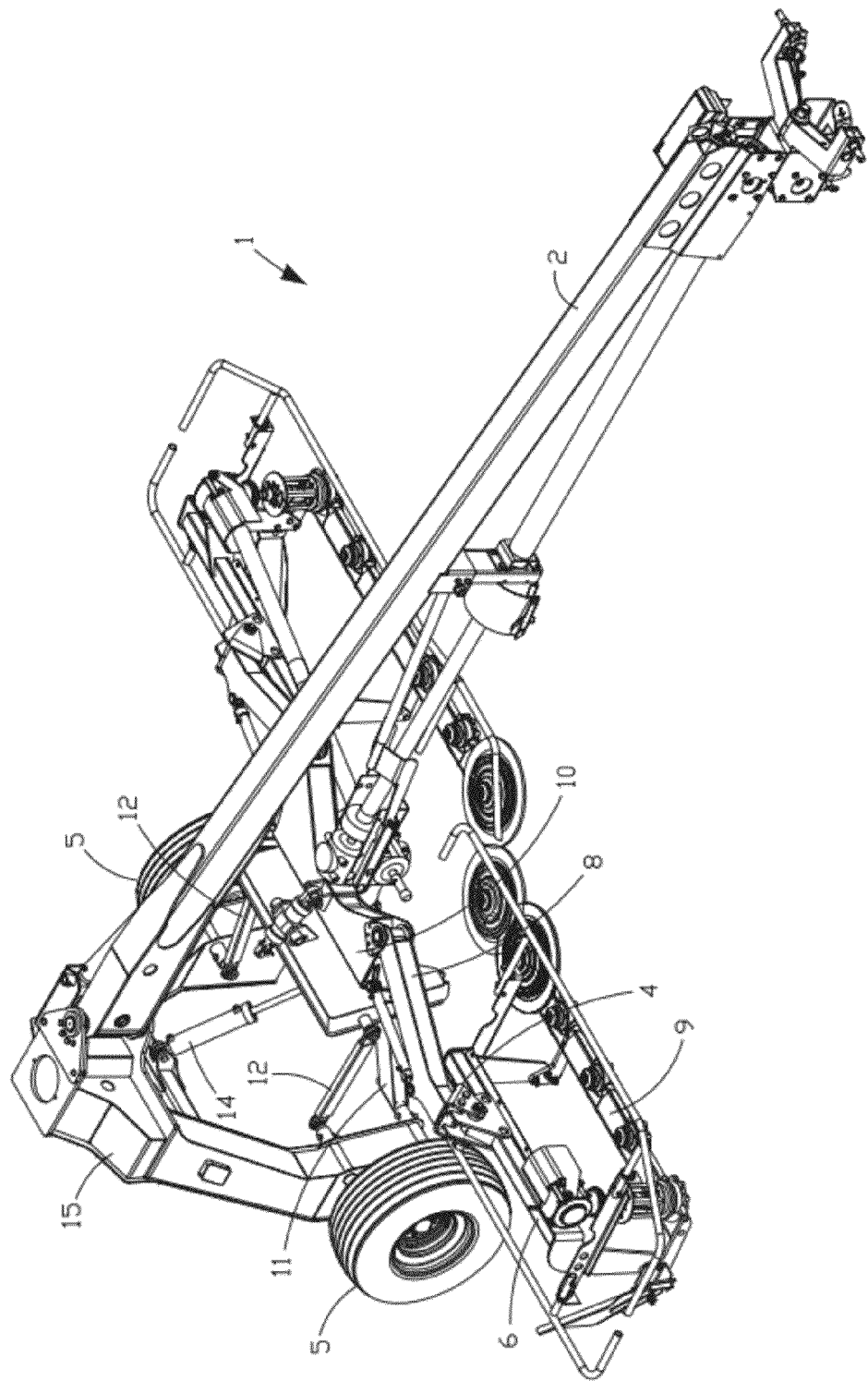
FIG. 6b is an isometric view of the mower in operational configuration.

As illustrated especially in FIGS. 1a and 6b, the two independent header sections 9 are preferably supported independently by their respective arms 8 on cylindrical bearings 4. These cylindrical bearings 4 permit the two header sections 9 to independently conform to the ground contour. In FIG. 10, it is readily seen that the two header sections 9 have taken on different angles with respect to the horizontal because one header section 9 has pivoted about its cylindrical bearings 4 more than the other header section 9. The feature of the present invention permitting the two header sections 9 to take on angles relative to the horizontal independently of one another is hereby defined as header section tilt for the purposes of this document, including the claims. It should be noted, float is an angling of the sub-frame 10, while header section tilt is an angling of one header section 9 with respect to the other header section 9.

Skid shoes, attached to the two header sections 9, operatively engage the ground and provide the forces required to cause the two header sections 9 to pivot about the cylindrical bearings 4 to conform to the ground contour. In conforming to the ground contour, cut crop height may be maintained more evenly, and there is less chance of engaging the cutters to the soil.

Figure 9:
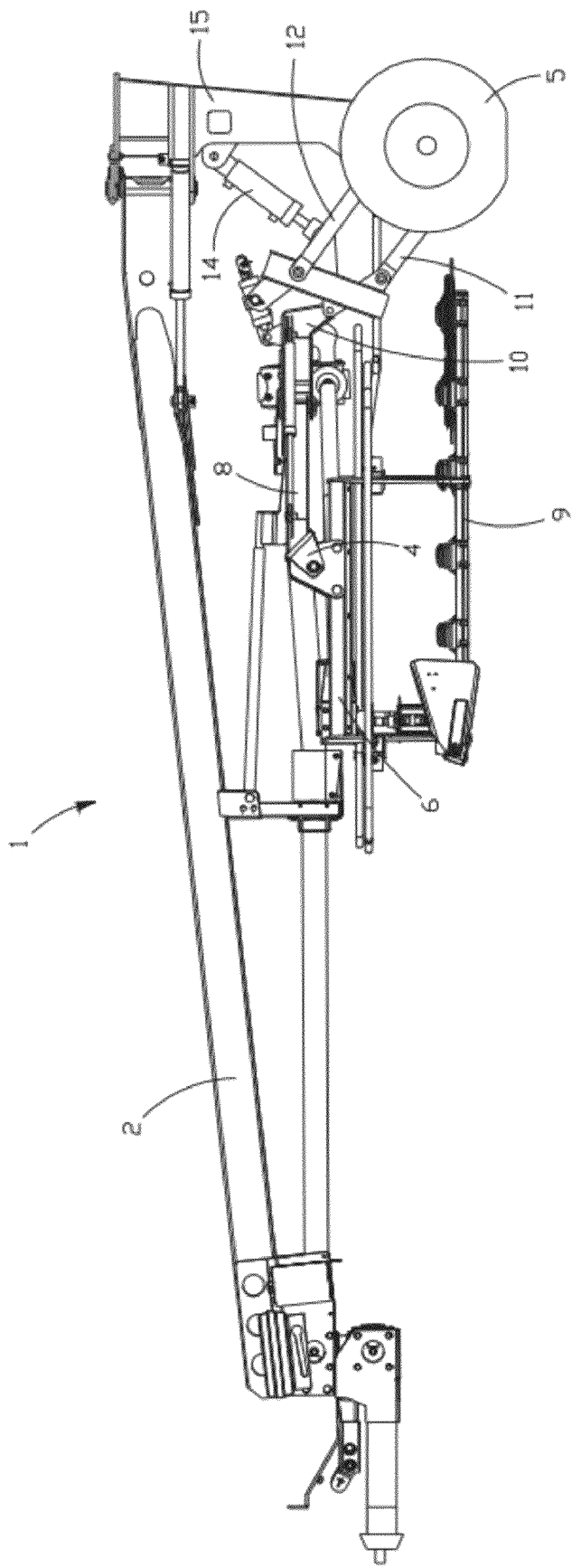
FIG. 9 is a left side elevation view of the rear of the mower showing the main frame mounted on wheels and showing the work tool in the transport position.

The two arms 8, pivotally mounted to the top of the forward portion of the sub-frame 10, also rotate about vertical axes of rotation. Consequently, the cutter bars 9 suspended from these arms 8 pivot toward or away from the longitudinal axis 52. As shown in FIGS. 5a, 6a, and 9 in the transport position, the arms 8 are rotated forward, thereby narrowing a width of the mower 1. In the operating mode illustrated in FIGS. 1b, 5b 6b, 10, and 12, the arms 8 are rotated toward the rear of the mower 1 such that the two cutter bars 9 lie substantially perpendicular to the direction of travel. The sub-frame lift cylinder 14 is used to raise the sub-frame 10 off the ground 65 for transport.

The sub-frame 10 is mounted on the suspension system in such a way as to give the sub-frame 10 a multidirectional freedom of motion. Hence, the underside of the cutter bar 9 is allowed to more consistently engage the ground surface 65 as the ground surface 65 varies. This results in benefits of a more consistent cut height, less crop wastage, and less frequent engagement of the cutters into soil.

Figure 11:
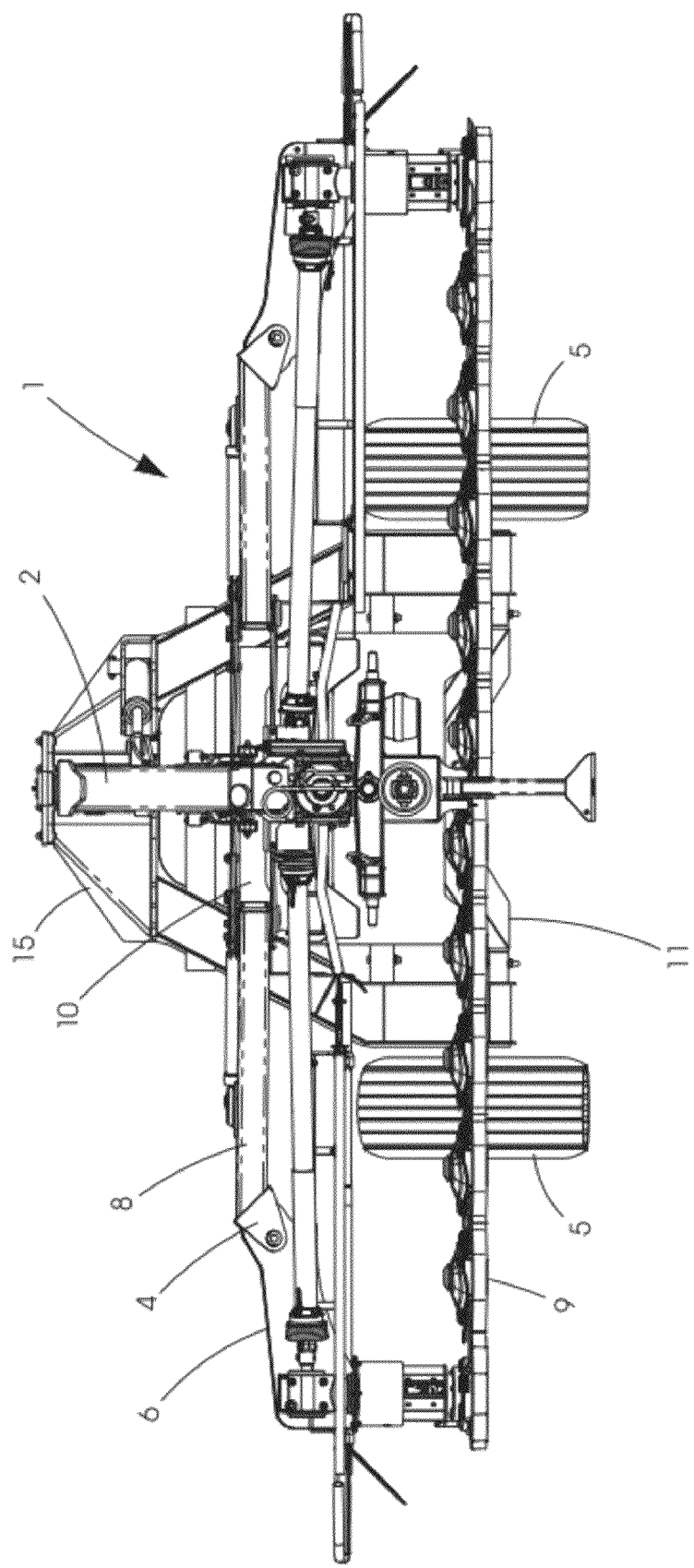
FIG. 11 is a front elevation view of the mower in transport mode with the work tool self-leveled.

Another significant benefit is realized by the converging and diverging arrangements of the lower linkage bars 11 and the upper linkage bars 12, in combination with the illustrated connection of the sub-frame lift cylinder 14 to the sub-frame 10. Due to the lower linkage bars 11 being in compression and the upper linkage bars 12 being in tension whenever the sub-frame lift cylinder 14 carries any of the header's 6 weight, the header 6 is self-leveling, as shown in FIG. 11, yet the header 6 is permitted to conform to the ground slope when in operation, as shown in FIG. 10. Further, due to the compression in the lower linkage bars 11, the header will tend to center itself relative to the main frame 15 on retraction of the sub-frame lift cylinder 14.

The point at which the sub-frame lift cylinder 14 connects to the sub-frame must be above the connection point of the lower linkage arms 11 to the sub-frame and below the connection point of the upper linkage arms 12 to the sub-frame in order to effect the compression of the lower links 11 and tension of the upper links 12 explained above.

Figure 13:
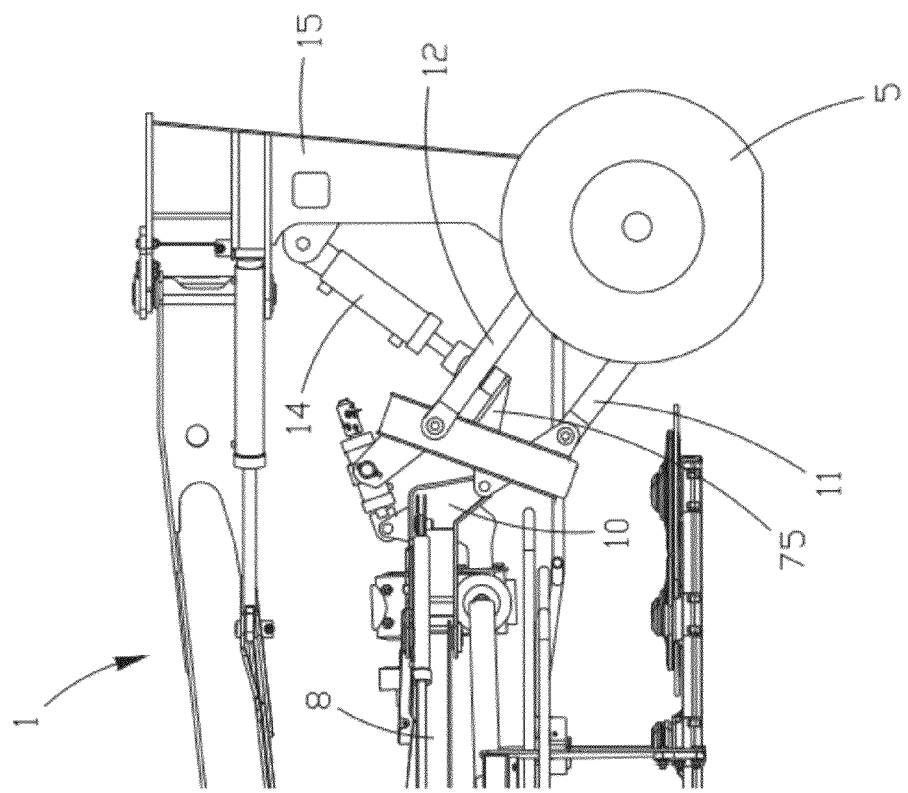
FIG. 13 is a left side elevation view of the rear of the mower showing one of two leveling brackets.

An additional leveling feature is illustrated in FIG. 13. As the header 9 is raised from the operating position, to the transport position, and the upper linkage bars 12 reach an extreme raised position, the upper linkage bars 12 make contact with a leveling bracket 75, causing the sub-frame 10 to become substantially parallel to the axis of rotation of the wheels 5. A benefit is, if one side of the header becomes heavy due to accumulation of crop material, the header will still become level for transport. Additionally, the likelihood of the sub-frame 10 swaying while the agricultural mower 1 is in its transport position is greatly reduced. The sub-frame 10 is provided with a locking arrangement for the transport position to eliminate the risk of the sub-frame 10 dropping to the ground 65 during transport.

The embodiments of the novel suspension system herein described may be utilized for any implement making use of a floating work tool. The invention is not intended to be limited to agricultural mowers.

The above embodiments are the preferred embodiments, but this invention is not limited thereto. It is, therefore, apparent that many modifications and variations of the present invention are possible in light of the above teachings. It is, therefore, to be understood that within the scope of the appended claims, the invention may be practiced otherwise than as specifically described.

I claim:

1. A method of suspending a header from a towed implement to permit the header to float, the towed implement comprising a main frame, a sub-frame comprising a first side and a second side, and a four-bar linkage system comprising an upper link, a lower link, and an actuator, the method comprising:
   (a) operatively, pivotally attaching a first end of the upper link to the main frame of the towed implement using a first spherical bearing;
   (b) operatively, pivotally attaching a second end of the upper link to the first side of the sub-frame using a second spherical bearing;
   (c) operatively, pivotally attaching a first end of the lower link to the main frame using a first cylindrical bearing;
   (d) operatively, pivotally attaching a second end of the lower link to the first side of the sub-frame using a third spherical bearing in such a way that the upper link is not parallel to the lower link;
   (e) operatively, pivotally attaching the actuator to the first side of the sub-frame at a point lower than the second end of the upper link and higher than the second end of the lower link;
   (f) operatively attaching the header of the towed implement to the second side of the sub-frame, and
   (g) operatively rotatably attaching at least one ground engaging wheel to the main frame along a substantially horizontal axis, the main frame being fixed with respect to the horizontal axis of the ground engaging wheel.

2. The method of claim 1 wherein operatively, pivotally attaching the second end of the upper link to the first side of the sub-frame comprises operatively, pivotally attaching the second end of the upper link to the rear side of the sub-frame.

3. The method of claim 2 wherein operatively attaching the header of the towed implement to the second side of the sub-frame comprises operatively attaching the header of the towed implement to the front side of the sub-frame.

4. The method of claim 1 wherein the lower link comprises a first lower link and the upper link comprises a first upper link, the towed implement additionally comprising a second lower link and a second upper link, the method additionally comprising:
  (a) operatively, pivotally attaching a first end of the second upper link to the main frame of the towed implement using a fourth spherical bearing;
  (b) operatively, pivotally attaching a second end of the second upper link to the sub-frame using a fifth spherical bearing;
  (c) operatively, pivotally attaching a first end of the second lower link to the main frame using a second cylindrical bearing; and
  (d) operatively, pivotally attaching a second end of the second lower link to the sub-frame using a sixth spherical bearing in such a way that the second lower link is not parallel to the second upper link.

5. The method of claim 4 additionally comprising operatively, rigidly attaching the second end of the first lower link to the second end of the second lower link.

6. The method of claim 4 additionally comprising disposing the first end of the first upper link nearer the first end of the second upper link than the second end of the first upper link to the second end of the second upper link.

7. The method of claim 4 additionally comprising disposing the second end of the first lower link nearer the second end of the second lower link than the first end of the first lower link to the first end of the second lower link.

8. The method of claim 4 additionally comprising disposing the first end of the first lower link nearer the first end of the second lower link than the second end of the first lower link to the second end of the second lower link.

9. The method of claim 4 additionally comprising disposing the second end of the first upper link nearer the second end of the second upper link than the first end of the first upper link to the first end of the second upper link.

10. The method of claim 4 additionally comprising:
  (a) applying a force to the sub frame with the actuator in a direction toward the main frame;
  (b) placing the upper links in tension due to the force;
  (c) placing the lower links in compression due to the force;
  (d) raising the sub-frame due to the force; and
  (e) permitting the sub-frame to self-level due to the tension in the upper links and the compression in the lower links.

11. The method of claim 1 wherein the header comprises a first header section and a second header section, the method comprising:
  (a) suspending the first header section from the first cylindrical bearing;
  (b) disposing an axis of rotation of the first cylindrical bearing substantially parallel to a longitudinal direction of the towed implement;
  (c) suspending the second header section from a second cylindrical bearing;
  (d) disposing an axis of rotation of the second cylindrical bearing substantially parallel to a longitudinal direction of the towed implement; and
  (e) permitting the first header section to pivot on the first cylindrical bearing independently of the pivoting of the second header section on the second cylindrical bearing.

12. A towed implement comprising:
  (a) a left side;
  (b) a right side;
  (c) a main frame;
  (d) a first ground engaging wheel disposed on the left side of the towed implement for supporting the towed implement, the towed implement having a longitudinal axis substantially perpendicular to an axis of rotation of the first ground engaging wheel;
  (e) a second ground engaging wheel disposed on the right side of the towed implement for supporting the towed implement;
  (f) a sub-frame for supporting a work tool;
  (g) a left upper link having a first end operatively, pivotally connected to the main frame by a spherical bearing; and a second end operatively, pivotally connected to the sub-frame by a spherical bearing;
  (h) a right upper link having a first end operatively, pivotally connected to the main frame by a spherical bearing, and a second end operatively, pivotally connected to the sub-frame by a spherical bearing;
  (i) a lower link having a first end operatively, pivotally connected to the main frame by a cylindrical bearing, and a second end operatively pivotally connected to the sub-frame by a spherical bearing, the left upper link and the right upper link being non-parallel;
  (j) an actuator, operatively, pivotally connected to the sub-frame at a lower point than the second end of the left upper link and the right upper link, and higher than the second end of the lower link; and
  (k) a work tool, operatively attached to the sub-frame.

13. The towed implement of claim 12 wherein the lower link comprises a left lower link, the towed implement additionally comprising a right lower link having a first end operatively, pivotally connected to the main frame by a cylindrical bearing, and a second end operatively, pivotally connected to the sub-frame by a spherical bearing.

14. The towed implement of claim 13 wherein the second end of the left lower link is operatively, rigidly affixed to the second end of the right lower link.

15. The towed implement of claim 12 wherein the first end of the left upper link and the first end of the right upper link are disposed nearer to one another than the second end of the left upper link and the second end of the right upper link.

16. The towed implement of claim 12 wherein the first end of the left upper link and the first end of the right upper link are disposed farther apart relative to one another than the second end of the left upper link and the second end of the right upper link.

17. The towed implement of claim 13 wherein the first end of the left lower link and the first end of the right lower link are disposed nearer to one another than the second end of the left lower link and the second end of the right lower link.

18. The towed implement of claim 13 wherein the first end of the left lower link and the first end of the right lower link are disposed farther apart relative to one another than the second end of the left lower link and the second end of the right lower link.

19. The towed implement of claim 12 additionally comprising a tongue, operatively, pivotally connected to the main frame.

20. The towed implement of claim 12 wherein the sub-frame is disposed in front of the main frame.

21. The towed implement of claim 12 wherein the left upper link and lower link are substantially parallel when viewed from a transverse direction.

22. The towed implement of claim 12 additionally comprising:
   (a) an actuator attachment point disposed to a first side of the sub-frame and whereby the actuator is operatively, pivotally connected to the sub-frame; and
   (b) a work tool attachment point disposed to a second side of the sub-frame and whereby the work tool is operatively attached to the sub-frame.

23. The towed implement of claim 22 where in the first side of the sub-frame comprises the rear side of the sub-frame.

24. The towed implement of claim 22 where in the second side of the sub-frame comprises the front side of the sub-frame.

25. A towed implement comprising:
   (a) a main frame having a front, a left side and a right side;
   (b) a first ground engaging wheel, disposed on the left side of the main frame for operatively supporting the towed implement on the ground, the main frame additionally comprising a longitudinal axis substantially perpendicular to an axis of rotation of the first ground engaging wheel;
   (c) a second ground engaging wheel, disposed on the right side of the main frame for operatively supporting the towed implement on the ground;
   (d) a two-component sub-frame for supporting a work tool wherein a first component of the sub-frame is operatively, pivotally connected to the main frame, and a second component of the sub-frame is operatively, pivotally connected to the work tool;
   (e) a left upper link having a first end operatively, pivotally connected to the main frame by a spherical bearing; and a second end operatively, pivotally connected to the sub-frame by a spherical bearing;
   (f) a right upper link having a first end operatively, pivotally connected to the main frame by a spherical bearing, and a second end operatively, pivotally connected to the sub-frame by a spherical bearing, the left and right upper links being non-parallel to each other; and
   (g) a lower link having a first end operatively, pivotally connected to the main frame by a cylindrical bearing, and a second end operatively pivotally connected to the sub-frame by a spherical bearing; and
   (h) an actuator connected to the sub-frame at a point lower than the second end of the left upper link and the right upper link, and higher than the second end of the lower link.

26. The towed implement of claim 25 wherein the lower link comprises a left lower link, the towed implement additionally comprising a right lower link having a first end operatively, pivotally connected to the main frame by a cylindrical bearing, and a second end operatively, pivotally connected to the sub-frame by a spherical bearing, the right lower link being non-parallel to the right lower link.

27. The towed implement of claim 26 wherein the second end of the left lower link is operatively, rigidly affixed to the second end of the right lower link.

28. A method of suspending a header from a towed implement to permit the header to float, the towed implement comprising a main frame, a sub-frame, and a four-bar linkage system comprising an upper link and a lower link, the method comprising:
   (a) operatively, pivotally affixing an end of the upper link to the sub-frame;
   (b) operatively, pivotally affixing an end of the lower link to the sub-frame at a point on the sub-frame lower than the end of the upper link in such a way that the lower link is not parallel to the upper link;
   (c) operatively, pivotally affixing an actuator to the sub-frame below the end of the upper link and above the end of the lower link;
   (d) applying a force to the sub frame with the actuator in a direction toward the main frame;
   (e) placing the upper link in tension due to the force;
   (f) placing the lower link in compression due to the force;
   (g) raising the sub-frame due to the force; and
   (h) permitting the sub-frame to self-level due to the tension in the upper link.

29. The method of claim 28 wherein the upper link comprises a first upper link having a first end and a second end, and the lower link comprises a first lower link having a first end and a second end, and wherein the towed implement additionally comprises a second upper link having a first end and a second end and a second lower link having a first end and a second end, the method comprising:
   (a) disposing the first end of the first upper link nearer the first end of the second upper link than the second end of the first upper link to the second end of the second upper link;
   (b) disposing the second end of the first lower link nearer the second end of the second lower link than the first end of the first lower link to the first end of the second lower link;
   (c) placing the first and second lower links in compression due to the force;
   (d) placing the first and second upper links in tension due to the force;
   (e) permitting the sub-frame to center on the main frame due to the tension in the first and second upper links.

30. A method of stabilizing a header on a towed implement, the towed implement comprising a ground engaging wheel with an axis of rotation, a main frame, a sub-frame, and a four-bar linkage system comprising an upper link, and a lower link, the method comprising:
   (a) operatively, pivotally affixing an end of the upper link to the sub-frame;
   (b) operatively, pivotally affixing an end of the lower link to the sub-frame at a point on the sub-frame lower than the end of the upper link in such a way that the lower link is not parallel to the upper link;
   (c) operatively, pivotally affixing an actuator to the sub-frame below the end of the upper link and above the end of the lower link;
   (d) applying a force to the sub frame with the actuator in a direction toward the main frame;
   (e) placing the upper link in tension due to the force;
   (d) placing the lower link in compression due to the force;
   (e) raising the sub-frame due to the force;
   (f) causing the header to self-level due to the tension of the upper link and the compression of the lower link;
   (g) engaging the upper link to a leveling bracket, thus forcing the sub-frame to become substantially parallel to the axis of rotation of the ground engaging wheel.

31. The method of claim 30 additionally comprising:
   (a) pivoting components of the header to narrow a width of the towed implement for transport; and
   (b) controlling a movement of the header during transport due to the tension of the lower link and the compression of the upper link.

32. A mower for mowing agricultural crops while moving in a forward direction of travel and cutting a swath a width between a mower left side and a mower right side comprising:
- a longitudinal plane parallel to the forward direction, oriented vertically and disposed equidistant from the mower left side and the mower right side;
- a sub-frame generally perpendicular to the longitudinal plane having a sub-frame left side, a sub-frame right side, a sub-frame upper side and a sub-frame lower side;
- a main frame with a portion that is perpendicular to the longitudinal plane;
- a four bar linkage comprising:
    - a first link extending between a first point at a connection to the sub-frame with a first spherical bearing and a second point at a connection to the main frame with a second spherical bearing with a first link axis extending between the first and second points along a line at a first angle relative to the longitudinal plane;
    - a second link extending between a third point at a connection to the sub-frame with a third spherical bearing and a fourth point at a connection to the main frame with a fourth spherical bearing with a second link axis extending between the third and fourth points along a line at a second angle relative to the longitudinal plane; and wherein the first angle is not equal to the second angle; and
- an actuator connected to the sub-frame at a place lower than the first point of connection of the first link to the sub-frame and higher than the third point of connection of the second link at a connection to the sub-frame.

33. The mower of claim 32 wherein the first link and second link are both disposed in a first transverse direction relative to the longitudinal plane.

34. The mower of claim 33 further comprising a second linkage set comprising:
- a third link extending between a fifth point at a connection to the sub-frame with a fifth spherical bearing and a sixth point at a connection to the main frame with a sixth spherical bearing with a third link axis extending between the fifth and sixth points along a line at a third angle relative to the longitudinal plane;
- a fourth link extending between a seventh point at a connection to the sub-frame with a seventh spherical bearing and an eighth point at a connection to the main frame with an eighth spherical bearing with a fourth link axis extending between the seventh and eighth points along a line at a fourth angle relative to the longitudinal plane;
- wherein the third angle is not equal to the fourth angle; and
- the second linkage set is disposed in a second transverse direction relative to the longitudinal plane, said second transverse direction not a same direction as the first transverse direction.

* * * * *

UNITED STATES PATENT AND TRADEMARK OFFICE
CERTIFICATE OF CORRECTION

PATENT NO.        : 8,261,521 B2
APPLICATION NO.   : 12/550797
DATED             : September 11, 2012
INVENTOR(S)       : Kent L. Thompson It is certified that error appears in the above-identified patent and that said Letters Patent is hereby corrected as shown below:

Column 10, line 54, delete "(c)" and substitute therefore --(e)--
Column 10, line 55, delete "(d)" and substitute therefore --(f)--
Column 10, line 56, delete "(e)" and substitute therefore --(g)--
Column 10, line 57, delete "(f)" and substitute therefore --(h)--
Column 10, line 59, delete "(g)" and substitute therefore --(i)--

Signed and Sealed this
Sixth Day of November, 2012

David J. Kappos
*Director of the United States Patent and Trademark Office*